United States Patent
Smith et al.

[15] 3,656,318
[45] Apr. 18, 1972

[54] CONSTANT VELOCITY UNIVERSAL JOINTS

[72] Inventors: Henry Thomas Smith, near Lichfield; Thomas Hughes Millward, Sutton Coldfield, both of England

[73] Assignee: GKN Birfield Transmissions Limited, Erdington, Birmingham, England

[22] Filed: Sept. 9, 1970

[21] Appl. No.: 70,867

[30] Foreign Application Priority Data

Sept. 9, 1969  Great Britain......................44,513/69

[52] U.S. Cl..................................................64/21, 29/434
[51] Int. Cl..................................................F16d 3/30
[58] Field of Search..................................64/21, 17; 29/434

[56] References Cited

UNITED STATES PATENTS 3,176,476  4/1965  Cull......................................64/21 X
3,550,396  12/1970  Miller....................................64/21

Primary Examiner—Edward G. Favors
Attorney—Spencer & Kaye

[57] ABSTRACT

A constant velocity universal joint including an inner member and an outer member with torque-transmitting balls therebetween has an outer member constituted by a tubular metal element shaped to provide the ball tracks and this shaped metal element is contained within and fixed against movement relative to an end portion of a propeller shaft.

10 Claims, 2 Drawing Figures

CONSTANT VELOCITY UNIVERSAL JOINTS

BACKGROUND OF THE INVENTION

1. Field of the Invention

This invention relates to constant velocity universal joints of the kind including an inner member adapted to be connected to either a driving shaft or a driven shaft, an outer member surrounding the inner member and adapted to be connected to either a driven shaft or a driving shaft, registering tracks formed respectively externally on the inner member and internally on the outer member, each pair of registering tracks being adapted to receive a torque-transmitting element, normally a ball, and means being provided for assisting in positioning the torque-transmitting elements in the bisector plane of the joint when relative angular displacement occurs between the inner and outer members.

2. Description of the Prior Art

Specification No. 2,352,776 discloses a constant velocity universal joint of the kind referred to above in which the outer member is in the form of a stamped sheet metal shell having tracks the inner surfaces of which are finished by a coining operation. The outer member includes a cylindrical part and a hub portion having a flange to which the cylindrical part is secured by a series of screws, the hub portion then being connected to a drive shaft.

Specification No. 3,016,721 discloses a constant velocity universal joint including a pair of outer members connected by a cylindrical spacer and a pair of inner members, one associated with each outer member and with a ball and socket connection between the two inner members. The two outer members are formed with tracks which receive trunnion blocks on arms of the inner members and the outer members are secured within the end portions of the interconnecting cylindrical spacer.

It is an object of the present invention to provide an improved construction of constant velocity universal joint of the kind referred to above and which will be commercially viable for a wider range of transmission drive applications than heretofore.

SUMMARY OF THE INVENTION

The outer member of a constant velocity universal joint of the kind referred to above is constituted by a metal element of tubular section "formed" to define the torque-transmitting-element-receiving tracks, said element being contained within and fixed against movement relative to an end portion of a tube which constitutes either the driving shaft or the driven shaft of the joint, which tube end portion serves to reinforce the tubular section element. By the expression "formed" as used herein is to be understood the treatment of the metal of said element by way of a pressing, extruding, swaging or other operation which shapes the metal but which does not involve the removal of any metal as by a cutting, grinding or like operation.

DESCRIPTION OF THE PREFERRED EMBODIMENTS

Figure 1:
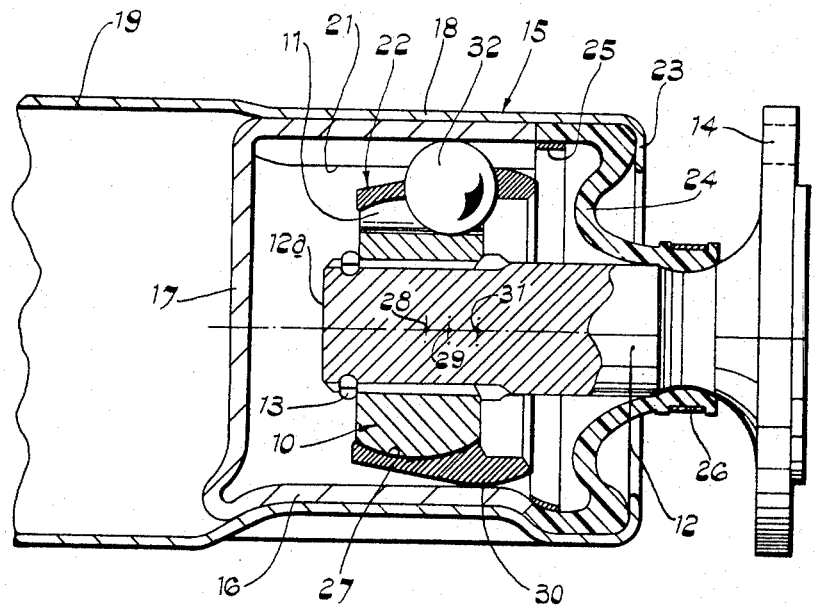
FIG. 1 is a sectional view of one form of constant velocity universal joint which provides for relative axial as well as for relative angular movement between the inner and outer members thereof.

Constant velocity universal joints have heretofore had a principal application in connection with front wheel drive motor vehicles and such joints are relatively expensive, for it has been the practice to form the tracks in both the outer and the inner member by milling and grinding operations and this, particularly in the case of the formation of internal tracks on the outer member, is a somewhat expensive operation.

Furthermore in the case of a conventional transmission drive shaft for a rear wheel drive motor vehicle it is still the practice to use Hooke's type universal joints for, although such joints do not provide for transmission of constant velocity drive between the driving and driven shafts, this disadvantage is far outweighed by the cost factor advantage as between a Hooke's type universal joint and known forms of constant velocity universal joints.

During recent years constant velocity universal joints have been designed so as to provide for relative axial, as well as relative angular, movement between the driven and driving members of the joint, such joints being known as plunge type constant velocity joints. But for the aforementioned cost factor, such plunge type constant velocity joints could have a very wide application since their inherent axial plunge feature enables one to eliminate the conventional spline coupling which has heretofore being an essential feature of transmission drive installations not withstanding the disadvantage of high axial loads under torque inherent in such couplings.

The present invention has as its principal object the reduction in the cost of producing constant velocity universal joints and by "forming" as opposed to machining the tracks in the outer member the cost of the tack producing operation is reduced. By fitting the tubular section element in the end of the associated tube whereby the tube wall serves to reinforce the tubular section element, said element can be formed of thin-walled material so reducing the cost thereof. The cost is further reduced in that, as the outer member is fixed directly in the end of the tube, there is no requirement for flanged or other joints for connecting the outer member to its associated driving or driven shaft.

In the form of our invention illustrated in the drawing, the joint includes an inner member 10 which is provided with straight longitudinally extending ball-receiving tracks 11, the inner member 10 being splined on to a shaft element 12 and retained thereon by a circlet 13 or like securing ring, the shaft element 12 having a flange 14 whereby it can be connected to, say, an output member of the gearbox of a motor vehicle.

Figure 2:
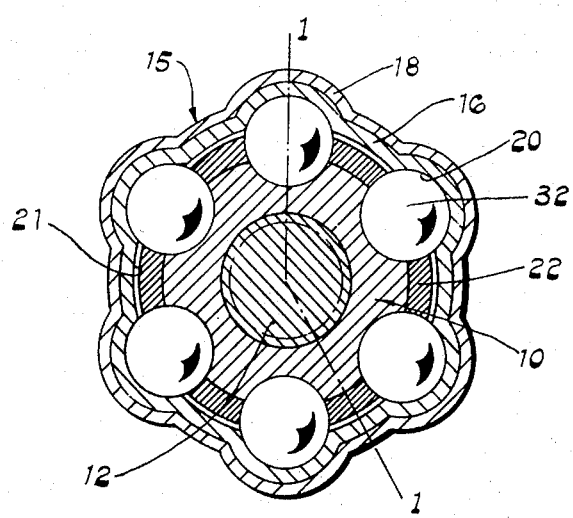
FIG. 2 is a section taken transversely to FIG. 1, the section of FIG. 1 being taken along the line 1—1 of FIG. 2.

The outer member 15 of the joint is of composite form and comprises a tubular-section insert 16 which is in the form of a cup-shaped pressing, having a base 17, the insert 16 being received in the one end portion 18 of a tube 19 constituting the main transmission propeller shaft of the vehicle transmission drive assembly, the arrangement being that after the insert 16 has been located in the end portion 18 of the shaft 19, the insert and end portion 18 of the shaft are subjected to a suitable forming operation so as to form the six-ball-receiving tracks as indicated by 20 in FIG. 2, the forming operation being such that the internal surfaces 21 between adjacent tracks 20 are all part of a common cylindrical surface so as to provide a cylindrical bearing surface for the outer face of the ball retaining cage 22. The tracks 20 formed in the outer member 15 are straight longitudinally extending tracks.

The end portion 18 of the tube 19 is initially of the same diameter as the remainder of the tube and the insert 16 initially has an external diameter proximating to the internal diameter of the tube 19 so that the insert can be readily fitted in said end portion. The assembled composite of the tube and insert is then deformed inwardly onto a die whereby the required track configuration is obtained and the die is then removed, removal of the die being facilitated by the tracks 20 being straight longitudinal tracks.

Although not illustrated in the drawing it is envisaged that the base 17 of the insert 16 may be indented so as to serve as a stop arranged to abut the end face 12a of the shaft element 12 to limit axial movement of the inner member 10 toward the base 17 of the insert 16.

As can be seen from FIG. 2, the internal and external cross-sections of the tube end portion 18 are of tracked form so that the insert 16/tube end portion 18 composite is of substantially uniform wall thickness with the cross-section of the end portion 18 complementary to that of the insert 16.

During the same or a subsequent forming operation the end of the end portion 18 of the tube 19 is plunged inwardly as shown at 23 so as to form a support for the one end of a somewhat Zrshaped seal or gaiter 24, the one end thereof being retained in engagement with the plunged end 23 of the tube 19 by means of an internal clip or ring 25 and the other end being retained on the shaft 12 which carries the inner member 10 by means of an externally mounted ring or clip 26.

The seal or gaiter 24 is positioned as shown in FIG. 1, so that part thereof is aligned with the bases of the tracks 20 "formed" in the outer member 15 so that the seal or gaiter 24 provides a resilient end stop limiting movement of the balls 32 and thus the inner member 10 relative to the outer member 15 to the right as viewed in FIG. 1.

An alternative and preferred method of producing the tube/insert composite includes "forming" the end portion 18 of the tube 19 to the configuration shown but without the inward plunge 23. The cup-shaped insert 16 is then positioned as a close sliding fit in said shaped end portion 18 which is contained within a mating die. The insert is then expanded so that the originally cylindrical wall portion thereof is deformed to provide the tracks and the tube end portion 18 is then deformed to provide the inward plunge 23. Expansion of the insert 16 is effected electrohydraulically and the expansion of the insert serves to secure the insert in the end portion 18 of the tube.

In a further alternative method of producing the tube/insert composite, the tracks are first "formed" in the insert, which is then positioned in the end portion 18 of the tube 19. The end portion 18 is then collapsed on to the "formed" insert.

As will be observed from reference to FIG. 1, the ball carrying cage 22 is such that the inner surface 27 thereof is of partspherical form being struck about a center 28 which is off-set to one side of the joint centre 29, whilst the outer surface of the cage 22 includes a part-spherical portion 30 struck about a center 31 which is off-set by an equal amount to the other side of the joint center 29.

Such an arrangement, which is fully described and claimed in prior British Pat. No. 1,072,144 ensures that, whilst there is freedom for relative axial movement between the inner and outer members 10 and 15 of the joint as a result of the outer member 15 being formed with straight longitudinally extending tracks, the mating surfaces between the cage 22 and the inner member 10 and the cage 22 and the outer member 15 respectively serve to position and maintain the torque-transmitting balls 32 in the bisector plane of the joint which positioning is of course a criterion for constant velocity operation of the joint.

As described above the insert 16 is of cup-like form such as to provide an integral end wall or base 17 closing one end of the bore in the outer member. Alternatively a separate closure plate may be fixed in the tube 19 to close the inner end of the bore in the outer member. In any event a lubricant tight enclosure is defined by the inner member, outer member, closure plate or end wall of the insert and the gaiter 24 which engages the plunged end 23 of the tube 19 and the shaft 12.

It is normally necessary for the tracks 20 which are provided in the outer member 15 by the forming operation to be hardened, e.g., either case-hardened or induction hardened and it is envisaged that one will make use of different steels for the tube 19 and for the insert 16, say SAE 1020 for the tube 19 and SAE 1040 for the insert. The hardening treatment will be applied to the inside face of the tracks after the forming operation and will only affect the insert. It is anticipated that when an induction hardening treatment is used this will have the effect of causing the insert 16 to expand somewhat thus increasing the "bond" between the insert 16 and the end portion 18 of the tube 19 and, furthermore, it is envisaged that the hoop stresses which will be set up as a result of the induction hardening will additionally assist in retaining the insert and the end portion of the tube in extremely firm relationship.

The wall thickness of the tube 19 and of the insert 16 can vary from about 2 percent to 16 percent of the diameter of the tube. The two thicknesses need not be the same.

For a joint for a tube having a diameter of 3 inches a typical wall thickness for the tube 19 is 0.07 inches and a typical wall thickness for the insert 16 is 0.1 inches. It can thus be seen that a C.V. joint in accordance with the invention can be made of material of thin-wall form and is therefore economical to produce.

As a construction as described above enables the outer member of a joint to be formed very much more cheaply than heretofore it offers the possibility of a transmission drive unit with a plunge type C.V. joint at either one or both ends thereof as a viable commercial alternative to the present arrangement wherein a Hooke's joint is provided at each end and there is an intermediate spline coupling.

Equally the invention can be applied to the formation of a constant velocity joint which is not of the plunge type.

Furthermore, although the invention has been described in relation to its primary application in the vehicle transmission field it is capable of a wide application in the industrial field.

We claim:

1. In a constant velocity universal joint of the kind including an inner member having means for connection to a drive shaft, an outer member surrounding the inner member and having means for connection to a further drive shaft, registering tracks formed respectively externally on the inner member and internally on the outer member, the outer member comprising a metal element of tubular section the tracks of which are formed by a non-cutting operation, a torque-transmitting element received in each pair of registering tracks and means provided for assisting in positioning the torque-transmitting elements in the bisector plane of the joint when relative angular displacement occurs between the inner and outer members, the improvement wherein the tubular element is fixed within an end portion of a tube constituting the further drive shaft and
the end portion of the tube is so shaped in the area of the tracks in the tubular element that it is complementary to the same such as to provide means affording radial and circumferential reinforcement of said area.

2. A joint according to claim 1 wherein the tracks in both the inner and outer members of the joint are longitudinally straight tracks and the joint is a plunging constant velocity universal joint.

3. A joint according to claim 1 wherein the tubular element is of cup-like form.

4. A joint according to claim 1 wherein the element is in the form of an open-ended tube and a closure plate is provided to close the inner end of the bore of said open-ended tube.

5. A joint according to claim 1 wherein the end of the tube is plunged inwardly so as to define a seating for a flexible seal of gaiter-like form between the outer member and the shaft upon which the inner member of the joint is carried.

6. In a method of manufacturing a constant velocity universal joint which includes providing an inner member having means for connection to a drive shaft and providing an outer member in the form of a tubular metal element having means for connection to a further drive shaft, said outer member surrounding the inner member and the two members being provided with registering tracks disposed respectively externally of the inner member and internally of the outer member, the tracks in the outer member being formed by a non-cutting operation and a torque-transmitting element being provided in each pair of registering tracks with the torque-transmitting elements maintained in the bisector plane of the joint when relative angular displacement occurs between the inner and outer members, the improvement which comprises fixing the tubular element of the outer member within an end portion of a tube constituting the further drive shaft and shaping the end portion of the tube in the area of the tracks in the tubular element so that it is complementary to the same and provides means affording radial and circumferential reinforcement of said area.

7. A method according to claim 6 which includes inserting the element in the end of the tube and in which the tracks are then "formed" so as to deform both the element and the tube to provide the required track configuration and to key the element to the tube.

8. A method according to claim 6 which includes shaping the end portion of the tube so that said end portion has the configuration required in the assembled joint and then inserting the tubular element in said shaped tube end portion and expanding the element so as to have a configuration which corresponds to and mates with that of the tube end portion.

9. A method according to claim 6 which includes shaping the tubular element to produce the required track configuration, inserting the shaped tubular element in the end of the tube and then collapsing the tube around the element.

10. A method according to claim 6 which includes subjecting the tracks formed in the outer member by a hardening treatment selected from case hardening and induction hardening.

* * * * *